United States Patent
Roh et al.

(10) Patent No.: US 7,586,837 B2
(45) Date of Patent: Sep. 8, 2009

(54) ACQUISITION OF A GATED PILOT SIGNAL

(75) Inventors: Mark Roh, San Diego, CA (US); Raghu Challa, San Diego, CA (US); Serguei A. Glazko, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1424 days.

(21) Appl. No.: 10/056,920

(22) Filed: Jan. 24, 2002

(65) Prior Publication Data

US 2003/0137996 A1    Jul. 24, 2003

Related U.S. Application Data

(60) Provisional application No. 60/340,232, filed on Dec. 14, 2001.

(51) Int. Cl.
  *H04J 11/00*    (2006.01)
  *H04B 3/10*    (2006.01)
  *H04B 1/10*    (2006.01)
  *H04L 27/06*   (2006.01)

(52) U.S. Cl. ............... 370/210; 370/491; 370/500; 375/140; 375/343

(58) Field of Classification Search ............ 370/210, 370/335, 491, 500; 375/134, 142, 340, 343, 375/144–150, 130, 140, 316
See application file for complete search history.

(56) References Cited

U.S. PATENT DOCUMENTS

| | | | | |
|---|---|---|---|---|
| 5,463,657 A * | 10/1995 | Rice | ............................ | 375/150 |
| 5,715,236 A * | 2/1998 | Gilhousen et al. | ............ | 370/209 |
| 5,781,543 A * | 7/1998 | Ault et al. | .................... | 370/342 |
| 5,799,010 A * | 8/1998 | Lomp et al. | .................. | 370/335 |
| 5,805,648 A * | 9/1998 | Sutton | ......................... | 375/367 |
| 5,812,593 A * | 9/1998 | Kaku | .......................... | 375/150 |
| 5,822,364 A * | 10/1998 | Yamada et al. | ............... | 375/147 |
| 6,263,010 B1 * | 7/2001 | Naruse et al. | ................ | 375/130 |
| 6,272,174 B1 * | 8/2001 | Murphy | ....................... | 375/235 |
| 6,414,985 B1 * | 7/2002 | Furukawa et al. | ............ | 375/142 |
| 6,567,462 B1 * | 5/2003 | Brunner et al. | .............. | 375/148 |
| 6,594,286 B2 * | 7/2003 | Chen et al. | ................... | 370/529 |
| 6,650,694 B1 * | 11/2003 | Brown et al. | ................. | 375/150 |
| 6,804,264 B1 * | 10/2004 | Song | ........................... | 370/500 |

(Continued)

OTHER PUBLICATIONS

3GPP2 C.S0024, Version 2.0, Oct. 27, 2000, "cdma2000 High Rate Packet Data Air Interface Specification".

*Primary Examiner*—Hong Cho
(74) *Attorney, Agent, or Firm*—Kent D. Baker; Jeffrey D. Jacobs

(57) ABSTRACT

Systems and techniques are disclosed detecting an embedded signal which includes producing a plurality of first correlated values from a portion of the first signal and a second signal, transforming the first correlation values into a plurality of second correlation values related to a frequency content of the first correlation values, and searching for the embedded signal by evaluating the second correlation values. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

29 Claims, 4 Drawing Sheets

U.S. PATENT DOCUMENTS

| | | | |
|---|---|---|---|
| 6,813,478 B2 * | 11/2004 | Glazko et al. | 455/67.14 |
| 6,909,704 B2 * | 6/2005 | Sakoda | 370/335 |
| 6,977,915 B2 * | 12/2005 | Chen et al. | 370/335 |
| 7,027,464 B1 * | 4/2006 | Nakahara et al. | 370/503 |
| 2002/0041579 A1 * | 4/2002 | Tanno et al. | 370/335 |

* cited by examiner

ACQUISITION OF A GATED PILOT SIGNAL

CROSS REFERENCE

This application claims priority from Provisional Application No. 60/340,232, filed Dec. 14, 2001, entitled "Acquisition of a Gated Pilot Signal" and currently assigned to the assignee of the present invention.

BACKGROUND

1. Field

The present invention relates generally to communications systems, and more specifically, to systems and techniques for acquisition of a gated pilot signal.

2. Background

In wireless communications system, a user may access a network, or communicate with other users, through one or more base stations. Typically, each base station is configured to serve all users in a specific geographic region generally referred to as a cell. In some high traffic applications, the cell may be divided into sectors with a base station serving each sector. Each base station transmits a pilot signal which allows a user to synchronize with the base station and coherently demodulate the transmitted signal once the user is synchronized to the base station. The user generally establishes a communications channel with the base station having the strongest pilot signal.

The pilot signal is generally a known sequence embedded in the signal transmitted by the base station. By way of example, in code division multiple-access (CDMA) systems, the pilot signal can be characterized as an unmodulated signal spread with a known code. A user, or subscriber station, employs a locally generated replica of the spreading code to demodulate the pilot signal. The synchronization of the locally generated spreading code with the spread spectrum pilot signal is usually accomplished through an acquisition and tracking process. The acquisition process entails a search through an unknown region of time and frequency in order to bring the spread spectrum pilot signal into coarse alignment with the locally generated spreading code. Once the pilot signal has been acquired, a tracking loop can be used to optimize and maintain synchronization.

The ability of the subscriber station to acquire the pilot signal can be affected by numerous sources. By way of example, pilot signal acquisition can be severely hampered in the presence of residual frequency offsets in the baseband pilot signal due to local oscillator (LO) drift at the subscriber station or due to Doppler shift introduced by the relative motion between the subscriber station and base station. The difficulty in acquiring the pilot signal due to frequency offsets is a problem that is not unique to CDMA, but one that may be encountered in all communications systems.

SUMMARY

In one aspect of the present invention, a method of searching for an embedded signal in a first signal includes producing a plurality of first correlated values from a portion of the first signal and a second signal, transforming the first correlation values into a plurality of second correlation values related to a frequency content of the first correlation values, and searching for the embedded signal by evaluating the second correlation values.

In another aspect of the present invention, a method of searching for an embedded signal in a first signal includes correlating the first signal with a second signal by adjusting a phase of the first signal with respect to the second signal to produce a plurality of first correlated values for each of the first signal phases, transforming the first correlated values for each of the first signal phases into a plurality of second correlation values related to a frequency content of their respective first correlation values, and searching for the embedded signal by evaluating the second correlation values.

In yet another aspect of the present invention, a searcher includes a correlator configured to produce a plurality of first correlation values from first and second signals, a processor configured to transform the first correlation values into a plurality of second correlation values each relating to a different frequency component of the first signal, and a detector configured to monitor the second correlation values over a time period, and select one of the frequency components having a peak second correlation value.

In a further aspect of the present invention, a searcher includes means for producing a plurality of first correlation values from first and second signals, means for transforming the first correlation values into a plurality of second correlation values each relating to a different frequency component of the first signal, means for monitoring the second correlation values over a time period, and means for selecting one of the frequency components having a peak second correlation value.

In yet a further aspect of the present invention, computer-readable media embodying a program of instructions executable by a computer program performs a method of searching for an embedded signal in a first signal, the method including producing a plurality of first correlated values from a portion of the first signal and a second signal, transforming the first correlation values into a plurality of second correlation values related to a frequency content of the first correlation values, and searching for the embedded signal by evaluating the second correlation values.

In another aspect of the present invention, computer-readable media embodying a program of instructions executable by a computer program performs a method of searching for an embedded signal in a first signal, the method including correlating the first signal with a second signal by adjusting a phase of the first signal with respect to the second signal to produce a plurality of first correlated values for each of the first signal phases, transforming the first correlated values for each of the first signal phases into a plurality of second correlation values related to a frequency content of their respective first correlation values, and searching for the embedded signal by evaluating the second correlation values.

In yet another aspect of the present invention, a searcher includes a correlator configured to produce a plurality of first correlation values from first and second signals, a Fourier transform configured to transform the first correlation values into a plurality of second correlation values, and a detector configured to monitor the second correlation values over a time period, and select the second correlation value having a maximum magnitude.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings where.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration", and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

In an exemplary embodiment of a communications system, digital signal processing techniques can be employed to improve pilot signal visibility by removing residual frequency offsets in the baseband pilot signal. This can be achieved by separating the baseband pilot signal into its individual frequency components for the purposes of pilot signal acquisition. This approach can be utilized in any communications system utilizing a continuous or gated pilot signal. In at least one embodiment, a discrete Fourier transform (DFT) is used to determine the frequency content of the baseband pilot signal.

An exemplary process for acquiring a pilot signal can be illustrated with reference to a CDMA communications system. The CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different pseudo-random noise (PN) code that modulates a carrier, and thereby, spreads the spectrum of the signal waveform. The transmitted signals are separated in the receiver by a correlation process that uses a corresponding PN code to despread the desired signal's spectrum. The undesired signals, whose PN codes do not match, are not despread in bandwidth and contribute only to noise.

Although various aspects of the present invention will be described in the context of a CDMA communications system, those skilled in the art will appreciate that the techniques for acquiring a pilot signal are likewise suitable for use in various other communications environments. Accordingly, any reference to a CDMA communications system is intended only to illustrate the inventive aspects of the present invention, with the understanding that such inventive aspects have a wide range of applications.

Figure 1:
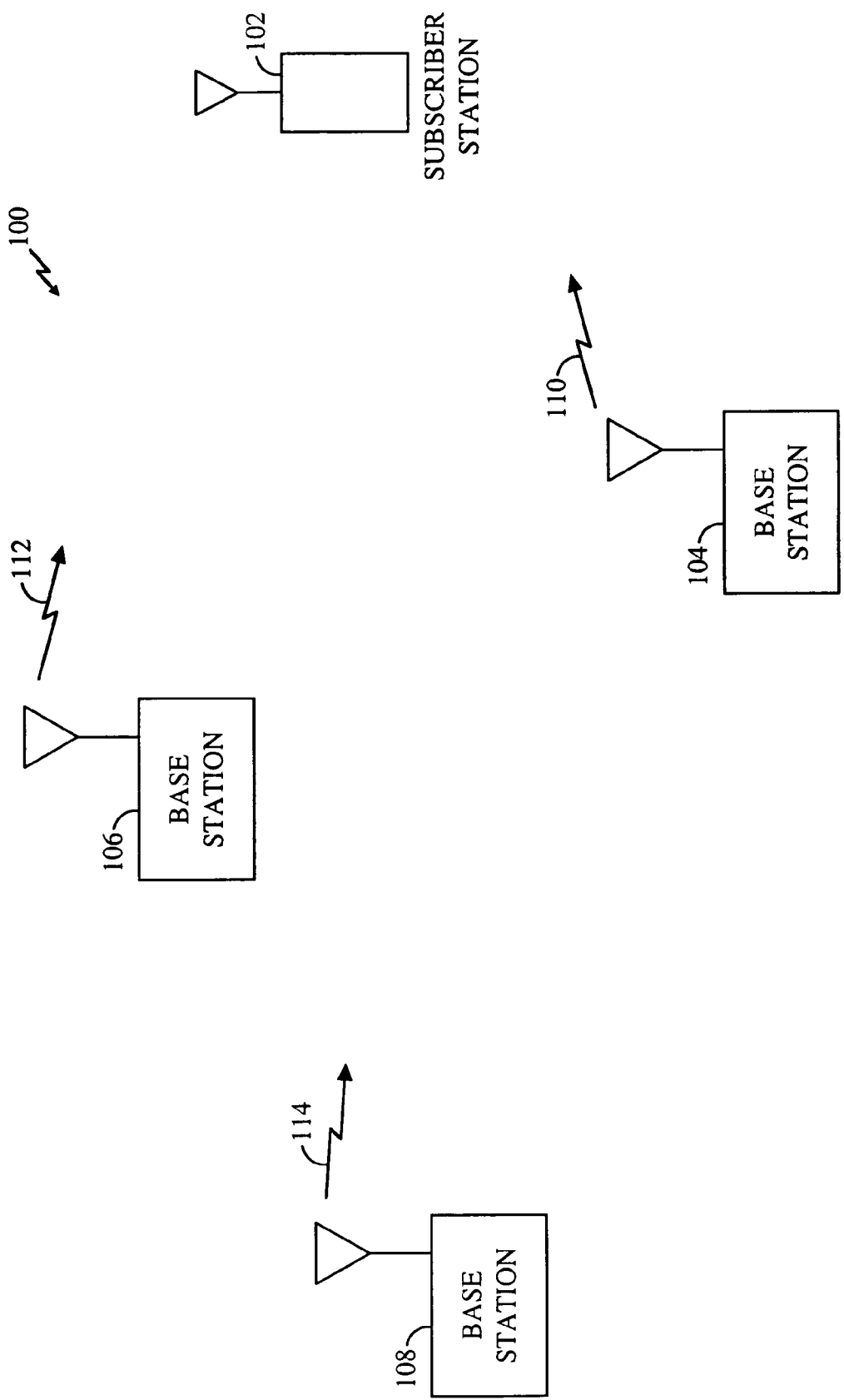
FIG. 1 is a system diagram of an exemplary communications system.

FIG. 1 is a system diagram of an exemplary communications system 100. The communications system provides a mechanism for a subscriber station 102 to access a network, or communicate with other subscriber stations, through one or more base stations. For ease of explanation, only three base stations 104, 106 and 108 are shown, however, as a matter of practice, numerous base stations will be operating with at least one base station located in every cell. Should the cells be divided into sectors, a base station could be located in each sector. Each base station 104, 106 and 108 transmits a pilot signal 110, 112 and 114, respectively, over a forward link. The forward link refers to transmissions from a base station to a subscriber station. The subscriber station 102 attempts to synchronize to the CDMA communications system using one or more of the pilot signals during initial acquisition.

The pilot signals transmitted from the base stations 104, 106, and 108 can be distinguished from one another by using different PN codes. A reduction in acquisition time may be achieved by using the same PN code to spread each pilot signal, but with a different phase offset. This approach provides sufficient channelization between the base stations because time shifted versions of the same PN code have very little correlation with one another. At the same time, the subscriber station need only search through a single PN code for all phase offsets.

The PN code used to spread the pilot signals may take on various forms depending on the system application, the operating environment, and the overall design constraints. For purposes of illustration, a periodic PN code which is 32,768 chips long with 512 phase offsets spaced apart by 64 chips will be used to describe the inventive pilot acquisition techniques. An exemplary CDMA communications system employing this methodology is a High Data Rate (HDR) communications system. The HDR communications system is typically designed to conform to one or more standards such as the cdma2000 High Rate Packet Data Air Interface Specification," 3GPP2 C.S0024, Version 2, Oct. 27, 2000, promulgated by a consortium called "$3^{rd}$ Generation Partnership Project." The contents of the aforementioned standard is incorporated by reference herein. In communications systems other than HDR, the length of the PN code for spreading the pilot signal, the number of phase offsets, and the spacings between the phase offsets can be varied to optimize system parameters without departing from the inventive concepts described throughout.

Figure 2:
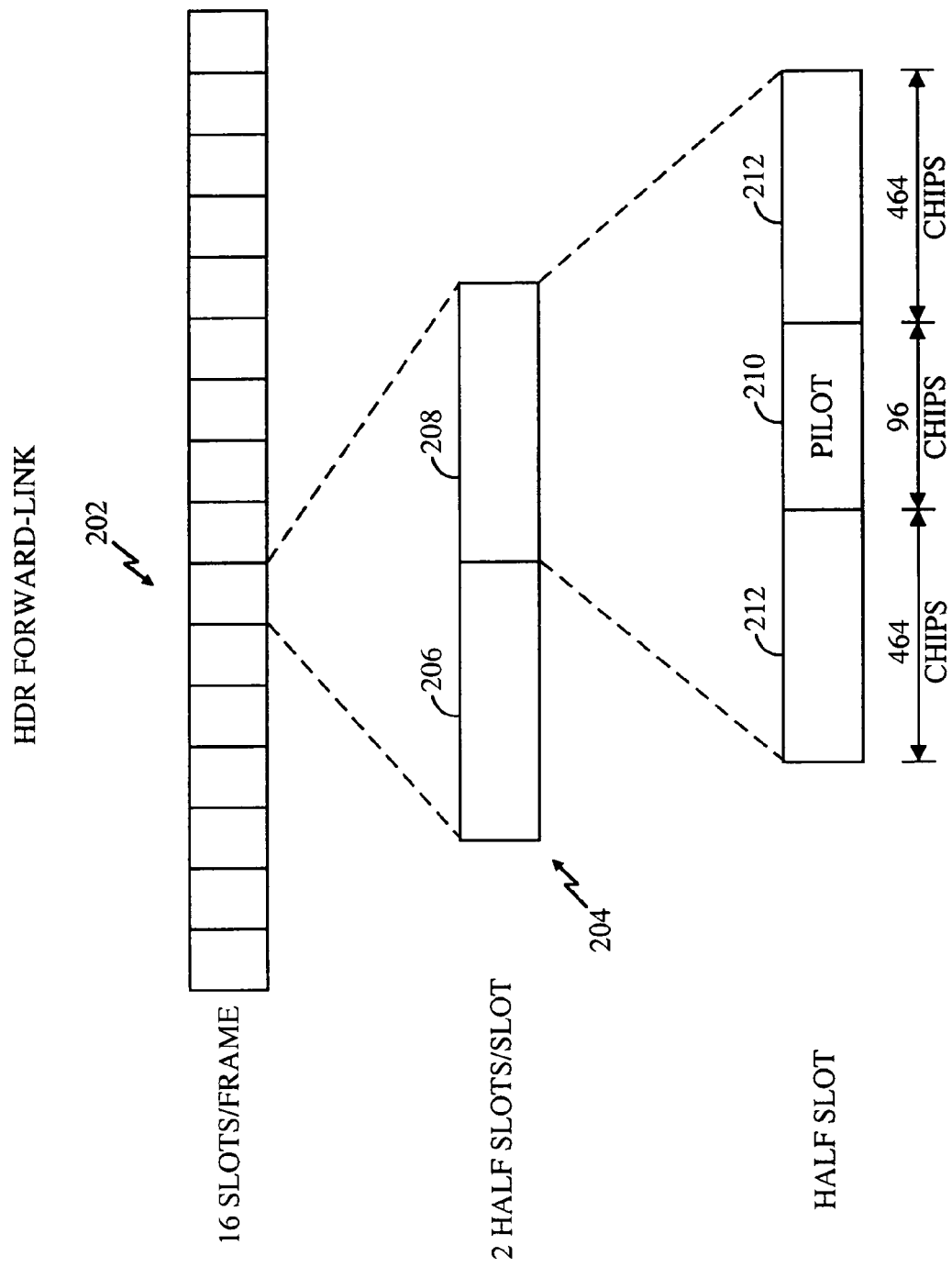
FIG. 2 is an exemplary forward link waveform for an HDR communications system.

The HDR communications system employs a gated pilot signal. An exemplary forward link waveform for an HDR communications system is shown in FIG. 2. The period of the PN code used to spread the pilot signal, i.e., 32,768 chips, can be defined as one frame 202. The frame is divided into 16 time slots each being 2048 chips long. Each time slot 204 is further divided into two half-slots 206, 208 with a gated pilot signal 210 centered within each half-slot. In the described exemplary embodiment, the gated pilot signal is chosen to be 96 chips in length. The gated pilot signal is generated from an unmodulated signal which is spread with the PN code and time-division multiplexed into the center of each half-slot. Various traffic and control channels can be time-division multiplexed into the remainder of each half-slot 212.

In the described exemplary HDR communications system, the frames transmitted by each base station are time aligned. As a result, the gating function applied to the pilot signal for each base station will occur simultaneously resulting in 512 unique spread spectrum gated pilot signals due to different phase offsets. The frame alignment can be achieved by synchronizing the base stations to one another in any manner known in the art. By way of example, the base stations could be synchronized to a common time reference such as the Navistar Global Positioning satellite navigation system.

Figure 3:
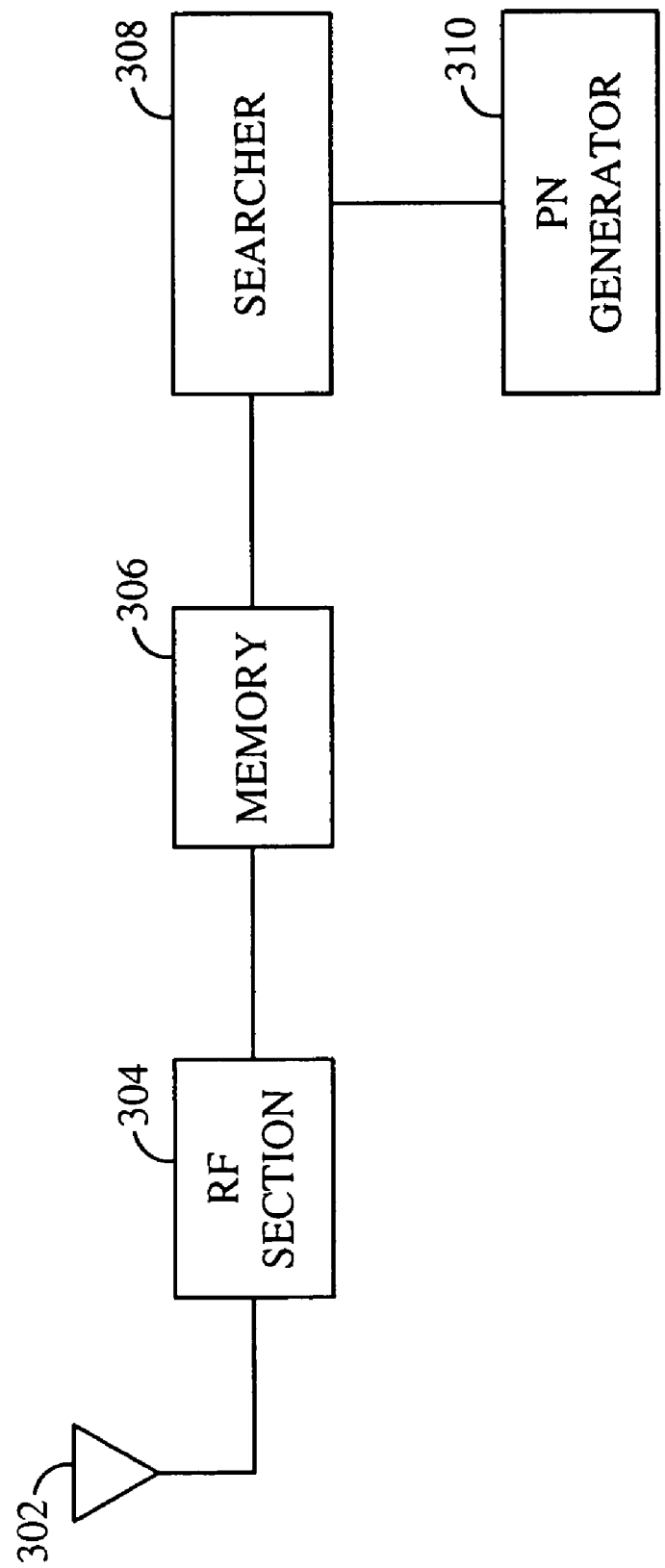
FIG. 3 is a functional block diagram of an exemplary receiver in a subscriber station operating in an HDR communications system.

FIG. 3 is a functional block diagram of an exemplary receiver in a subscriber station operating in the exemplary HDR communications system. In the described exemplary embodiment, the receiver is based on a heterodyne complex (I-Q) architecture. For ease of explanation, the described exemplary receiver is depicted functionally without reference to separate I (in-phase) and Q (quadrature) channels. Referring to FIG. 3, the transmitted signals from all the base stations are received through one or more antennas 302. The resulting superimposed signal received by the antenna 302 is provided to an RF section 304. The RF section 304 can be implemented in any manner known in the art. The RF section 304 amplifies, filters and down converts the superimposed signal to a baseband signal. The baseband signal is then sampled and stored in memory 306. The memory 306 should be sufficiently sized to store enough samples to cover at least one half-slot. This approach should result in at least one gated pilot signal being captured in memory 306. As will be described in greater detail below, one or more half-slots worth of samples can be stored in memory 306 to increase noise immunity during pilot signal acquisition.

An exemplary searcher 308 utilizes digital signal processing techniques to improve pilot signal visibility. The pilot signal acquisition process involves searching through the samples stored in memory 306 to find all gated pilot signals. The searcher 308 can perform this function by correlating the samples stored in memory 306 with locally generated replicas of the different PN codes used to spread the gated pilot signals. The correlation process involves an element-by-element multiplication of a locally generated PN code with a fixed number of samples from memory 308. The result is then summed (integrated) to produce a correlation value. The correlation value indicates the degree of similarity between the locally generated PN code and the samples. If the samples stored in memory 306 include two or more half-slots, correlation values can be computed over each half-slot and then combined (integrated) to improve pilot signal visibility. The correlation process should be performed for each possible PN code sequence. In the described exemplary HDR communications system, a PN generator 310 can be used to sequence through all 512 unique spread spectrum gated pilot signals.

In the described exemplary embodiment, the searcher 308 performs a correlation process using coherent and noncoherent integration. Coherent integration means that the phase information is preserved in the summation process. Noncoherent integration, on the other hand, means that phase information is lost in the summation process. These concepts can be represented mathematically for a sequence of complex numbers $(X_n+Y_n)$ for n=1, 2, 3 . . . N. The coherent sum is given as:

$$\sum_{n=1}^{N}(X_n + jY_n)$$

The noncoherent sum is given as:

$$\sum_{n=1}^{N}(X_n^2 + Y_n^2)$$

Coherent integration provides good noise immunity, but is sensitive to residual frequency offsets in the baseband pilot signal. Noncoherent combining is relatively insensitive to frequency offsets, but may result in poor performance in noisy environments. To optimize performance in the presence of frequency offsets and noise, coherent integration is generally performed over each half-slot with the results being noncoherently combined. The number of half-slots for which noncoherent combining is performed is based on performance and complexity tradeoffs. By increasing the number of half-slots for which noncoherent integration is performed, the memory requirements and the search time increases, but at the same time improved visibility of the pilot signal may be achieved.

Figure 4:
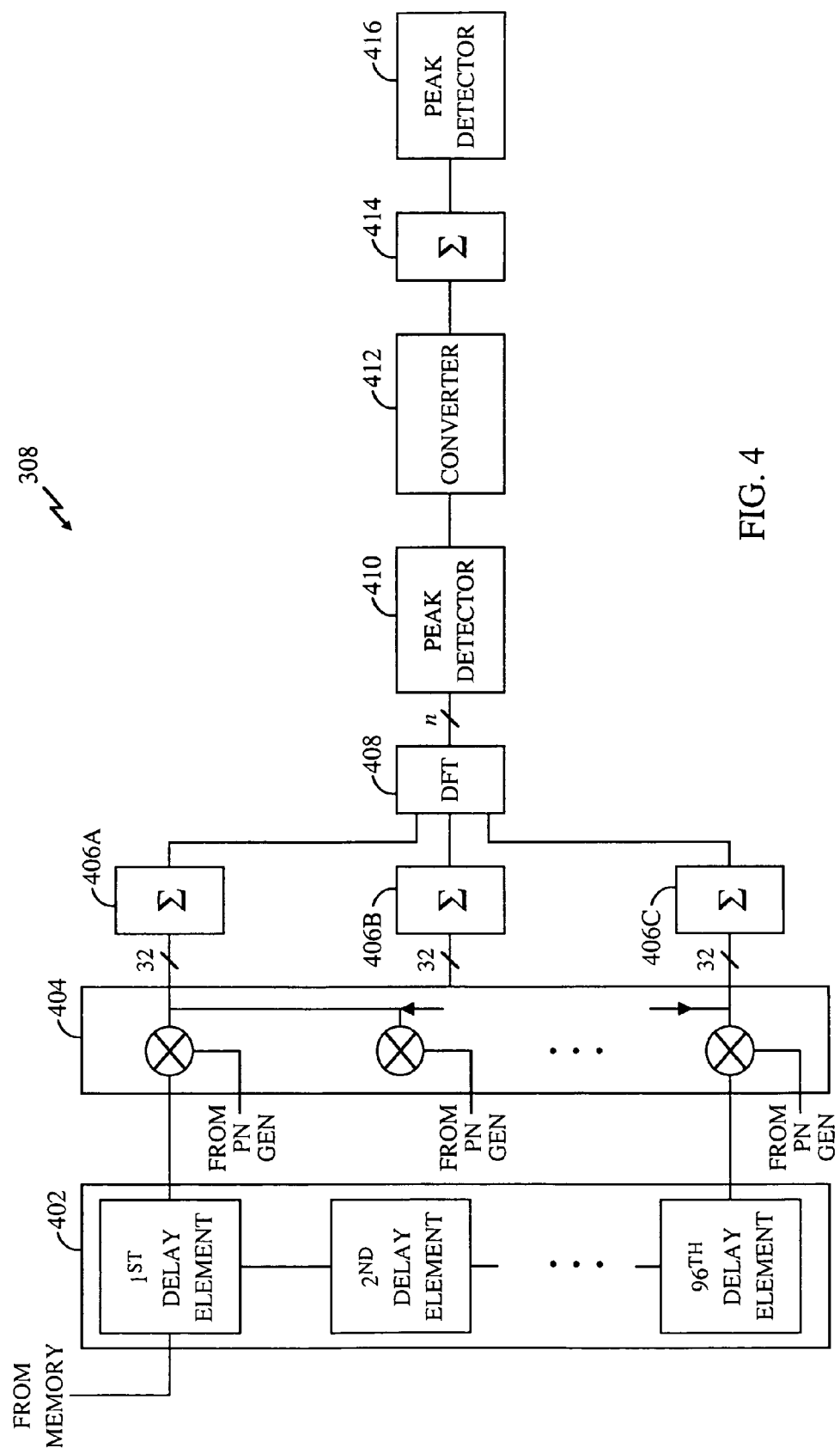
FIG. 4 is a functional block diagram of an exemplary searcher in a subscriber station receiver operating in an HDR communications system.

FIG. 4 is a functional block diagram of an exemplary searcher 308. The searcher includes a buffer 402 having a fixed depth. Functionally, the buffer 402 can be represented by a tapped delay line with delay elements arranged in series to temporarily store a sample sequence from memory 306 (see FIG. 3) during the correlation process. From an implementation standpoint, the buffer can be a shift register or any other similar device known in the art. The configuration of the buffer 402 may take on various forms depending on such factors as the system application, the operating environment, the overall design constraints, and the performance parameters. By way of example, a buffer operating in an HDR communications system with a 96 chip gated pilot signal can be implemented with 96 delay elements each having a tap as shown in FIG. 4. Alternatively, the buffer can be implemented with 64 delay elements each having a tap to support a 64 chip gated pilot signal. Various other buffer implementations are contemplated to support any gated pilot signal length used by the particular communications system.

The exemplary buffer 402 shown in FIG. 4 supports a correlation process in which the samples are sequentially shifted through the searcher in one-chip increments. As those skilled in the art will readily appreciate, the buffer can be implemented to support other incremental phase delays. By way of example, samples with delays that are spaced one-half chip apart typically provide good correlation gain without significantly increasing the search time. A buffer supporting this correlation methodology in an HDR communications system with a 96 chip gated pilot signal could be implemented with 192 delay elements with every other delay element having a tap. In this embodiment, the sampling rate of the baseband signal in the RF section should be increased to a one-half chip rate and the size of memory 306 (see FIG. 3) should also be increased to capture 2048 samples for coherently integrating one half-slot. Those skilled in the art will be readily able to assess the performance tradeoffs to determine the optimal phase increment for the samples.

Turning back to FIG. 4, the output of each delay element is provided to a multiplier 404 for an element-by-element multiplication of the samples stored in the buffer 402 with the locally generated PN code to produce 96 product values. The 96 product values can then be coherently combined in a variety of ways. Alternatively, the searcher could be implemented to coherently combine only a portion of the product values, by way of example 64 product values. The former may provide superior performance at low frequency offsets because of increased processing gain, but may result in poor pilot signal visibility with large frequency offsets. The exact number of product values that are coherently combined is application dependent and may vary depending on the communications environment and the overall design constraints.

In at least one embodiment, 96 product values can be coherently combined with relatively little impact due to residual frequency offsets in the baseband pilot signal. This can be achieved with a partial correlation process which produces a number of partial coherent sums from the 96 product values. The partial coherent sums can then be processed in a manner that maintains coherency. By way of example, the buffer 402 and multiplier 404 can be used in conjunction with three adders 406a, 406b, and 406c to perform a partial correlation process that produces three partial coherent sums each from 32 product values. The three partial coherent sums can be provided to a processor 408. The processor 408 effectively derotates and combines the partial coherent sums, and converts the result from a time-domain signal to a frequency-domain signal. The result is a sequential series of correlation values for one half-slot computed at different frequency offsets or components. As those skilled in the art will appreciate, the 96 product values may be coherently combined in other combinations. By way of example, two adders could be used to produce two partial coherent sums each from 48 product values. Alternatively, two or more adders can be used to produce any number of partial coherent sums from the 96 product values or any portion of the 96 product values. The manner in which the product values are used to produce the partial coherent sums may vary without departing from the inventive concepts described throughout.

The processor 408 can be implemented in a variety of fashions. By way of example, the processor 408 can implement a DFT algorithm to determine the frequency content of the partial coherent sums. Alternatively, the frequency content of the partial coherent sums can be determined with a Fast Fourier Transform algorithm implemented by the processor 408 to provide considerable savings in processor time due to a reduction in computational complexity. A number of digital filter banks is another method that can be used to determine the frequency content of the partial coherent sums.

For the purposes of describing the various exemplary embodiments throughout, the term processor is used in the broadest sense and meant to include a general purpose processor, a digital signal processor (DSP), an application specific integrated circuit (ASIC), a field programmable gate array (FPGA) or other programmable logic device, discrete gate or transistor logic, discrete hardware components, software or any other means known to those skilled in the art to process a signal.

A peak detector 410 can be used to evaluate the correlation value sequence over a half-slot for each frequency component. In the event that a gated pilot signal is successfully correlated with the locally generated PN code, a peak correlation value should result. The peak correlation value should be found in the correlation value sequence for the frequency component which is the closest to the actual residual frequency offset of the baseband pilot signal. By way of example, if the processor 408 computes five frequency components at −5 ppm (parts per million), −2.5 ppm, 0, 2.5 ppm, and 5 ppm, and the residual frequency offset in the baseband signal is 2.4 ppm due to LO drift, the peak correlation value should be found in the correlation value sequence for 2.5 ppm. For the purposes of illustration, 5 ppm in a 1 MHz. clock means the clock will be off by 5 clock pulses every second. The peak detector 410 can be used to determine the peak correlation value across all frequency components and pass only the correlation value sequence for that frequency component to a converter 412.

The converter 412 can be used to convert the sequential series of correlation values from a complex sequence having both magnitude and phase information to a magnitude sequence without phase information. In at least one embodiment, the converter 412 can be implemented with a multiplier which takes the $I^2+Q^2$ product of each correlation value. The $I^2+Q^2$ products for each half-slot can then be time aligned and provided to an adder 414 for noncoherent integration. The result being a single correlation value sequence having a length equal to one half-slot. A second peak detector 416 can be used to evaluate the correlation value sequence from the adder 414 for each of the 512 locally generated PN codes and select the PN code having the peak correlation value. If the selected peak correlation value exceeds a threshold, then the strongest gated pilot signal has been found and the demodulator (not shown) can attempt to lock to the carrier frequency.

Alternatively, the peak detector 410 can be positioned between the adder 414 and the second peak detector 416. With this implementation, the correlation value sequence for each frequency component is provided to the converter 412 and noncoherently combined with its respective frequency component from each half-slot. The peak detector 410 can then be used at the output of the adder 414 to determine the peak correlation value across all frequency components and select the sequential series of correlation values for that frequency component. The second peak detector 416 then evaluates the selected correlation value sequence for each of the 512 locally generated PN codes to find the peak correlation value. If the peak correlation value from the second peak detector 416 exceeds a threshold, then the strongest gated pilot signal has been found and the demodulator (not shown) can attempt to lock to the carrier frequency. This approach requires increased memory and processing resources as compared to the former method.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of searching for time offset information embedded in a first signal, comprising:
    correlating the first signal with a second signal by adjusting a phase of the first signal with respect to the second signal to produce a plurality of first correlated values for each of the first signal phases;
    transforming the first correlated values for each of the first signal phases into a plurality of second correlation values related to a frequency content of their respective first correlation values, wherein the frequency content of the first correlation values for each of the first signal phases comprises a plurality of frequency components, the second correlation values for each of the first signal phases each corresponding to a different one of the frequency components; and
    searching for the time offset information by evaluating the second correlation values, wherein searching comprises identifying the second correlation value with a maximum magnitude over a first portion of the first signal phases and identifying the second correlation value with a maximum magnitude over a second portion of the first signal phases, noncoherently combining the second correlation values for the frequency components having the identified second correlation values to produce a plurality of third correlation values, and using the third correlation value having a maximum magnitude to determine whether the time offset information is present.

2. The method of claim 1 wherein the correlation of the first and second signals further comprises multiplying a different portion of the first signal with the second signal to produce a plurality of product values for each of the first signal phases, and for each of the first phase signals, coherently combining different portions of the respective product values to produce a plurality of coherent sums each comprising one of the first correlation values.

3. The method of claim 1 wherein the time offset information corresponds to a pilot signal.

4. The method of claim 3 wherein the time offset information corresponds to a pilot signal spread by a code, and the second signal comprises a replica of the code.

5. The method of claim 4 wherein the code comprises a pseudo-random code.

6. The method of claim 1 wherein the transformation of the first correlation values comprises a Fourier transform.

7. The method of claim 6 wherein the Fourier transform comprises a discrete Fourier transform.

8. The method of claim 6 wherein the Fourier transform comprises a fast Fourier transform.

9. The method of claim 1 wherein the time offset information search comprises identifying the second correlation value with a maximum magnitude, and selecting the frequency component of the identified second correlation value.

10. A searcher, comprising:
    a correlator configured to produce a plurality of first correlation values from first and second signals, the first correlation values comprising at least one partial coherent sum, wherein the correlator comprises a multiplier configured to multiply the first signal with the second signal to produce a plurality of product values, and the multiplier comprises 96 multipliers each producing one product value;
    a processor configured to transform the first correlation values into a plurality of second correlation values each relating to a different frequency component of the first signal, wherein the processor derotates and combines the at least one partial coherent sums and converts the result from a time-domain signal to a frequency domain signal; and
    a detector configured to monitor the second correlation values over a time period, and select one of the frequency components having a peak second correlation value, wherein the multiplier further comprises a plurality of adders each configured to coherently combine different portions of the product values to produce a plurality of coherent sums each comprising one of the first correlation values, and further configured to monitor the second correlation values over a second time period, and select a second one of the frequency components having a peak second correlation value over the second time period, and further wherein the selected frequency components for both time periods each comprises a portion of the second correlation values each having a complex value, the searcher further comprising a converter configured to convert each of the complex values into a magnitude value, and an adder configured to noncoherently combine the second correlation values for the time period with the second correlation values for the second time period.

11. The searcher of claim 10 wherein the selected frequency components for both time periods are the same frequency component.

12. The searcher of claim 10 further comprising a second detector configured to detect a peak value for the noncoherently combined second correlation values.

13. A searcher, comprising:
    means for producing a plurality of first correlation values from first and second signals, the first correlation values comprising at least one partial coherent sum;
    means for transforming the first correlation values into a plurality of second correlation values each relating to a different frequency component of the first signal, wherein the means for transforming comprises means for derotating and means for combining the at least one partial coherent sums and means for converting the result from a time-domain signal to a frequency domain signal;
    means for monitoring the second correlation values over a time period;
    means for selecting one of the frequency components having a peak second correlation value;
    means for monitoring the second correlation values over a second time period; and
    means for selecting one of the frequency components having a peak second correlation value over the second time period, wherein the selected frequency components for both time periods each comprises a portion of the second correlation values each having a complex value, the searcher further comprising means for converting each of the complex values into a magnitude value, and means for noncoherently combining the second correlation values for the time period with the second correlation values for the second time period.

14. The searcher of claim 13 wherein the means for producing the first correlation values comprises means for multiplying the first signal with the second signal to produce a plurality of product values, and means for coherently combining different portions of the product values to produce a plurality of coherent sums each comprising the one of the first correlation values.

15. The searcher of claim 14 wherein the means for producing the first correlation values further comprises means for buffering the first signal to be multiplied with the second signal.

16. The searcher of claim 13 wherein the means for transforming the first correlation values comprises a Fourier transform.

17. The searcher of claim 16 wherein the Fourier transform comprises a discrete Fourier transform.

18. The searcher of claim 16 wherein the Fourier transform comprises a fast Fourier transform.

19. The searcher of claim 13 wherein the selected frequency components for both time periods are the same frequency component.

20. The searcher of claim 13 further comprising means for detecting a peak value for the noncoherently combined second correlation values.

21. Computer-readable media embodying a program of instructions executable by a computer program to perform a method of searching for time offset information in a first signal, comprising:
correlating the first signal with a second signal by adjusting a phase of the first signal with respect to the second signal to produce a plurality of first correlated values for each of the first signal phases;
transforming the first correlated values for each of the first signal phases into a plurality of second correlation values related to a frequency content of their respective first correlation values, wherein wherein the frequency content of the first correlation values for each of the first signal phases comprises a plurality of frequency components, the second correlation values for each of the first signal phases each corresponding to a different one of the frequency components; and
searching for the time offset information by evaluating the second correlation values, wherein searching comprises identifying the second correlation value with a maximum magnitude over a first portion of the first signal phases and identifying the second correlation value with a maximum magnitude over a second portion of the first signal phases, noncoherently combining the second correlation values for the frequency components having the identified second correlation values to produce a plurality of third correlation values, and using the third correlation value having a maximum magnitude to determine whether the time offset information is present.

22. The computer-readable media of claim 21 wherein the correlation of the first and second signals further comprises multiplying a different portion of the first signal with the second signal to produce a plurality of product values for each of the first signal phases, and for each of the first phase signals, coherently combining different portions of the respective product values to produce a plurality of coherent sums each comprising one of the first correlation values.

23. The computer-readable media of claim 21 wherein the time offset information corresponds to a pilot signal.

24. The computer-readable media of claim 23 wherein the time offset information corresponds to a pilot signal spread by a code, and the second signal comprises a replica of the code.

25. The computer-readable media of claim 24 wherein the code comprises a pseudo-random code.

26. The computer-readable media of claim 21 wherein the transformation of the first correlation values comprises a Fourier transform.

27. The computer-readable media of claim 26 wherein the Fourier transform comprises a discrete Fourier transform.

28. The computer-readable media of claim 26 wherein the Fourier transform comprises a fast Fourier transform.

29. The computer-readable media of claim 21 wherein the time offset information search comprises identifying the second correlation value with a maximum magnitude, and selecting the frequency component of the identified second correlation value.

* * * * *